United States Patent [19]

Aida et al.

[11] Patent Number: 4,963,087
[45] Date of Patent: Oct. 16, 1990

[54] EXPANSION INJECTION MOLDING DIE

[75] Inventors: Hiroshi Aida; Shoichi Hamada, both of Kawasaki; Hisanori Kato, Tokyo, all of Japan

[73] Assignee: Nippon Steel Chemical Co., Ltd., Tokyo, Japan

[21] Appl. No.: 344,131

[22] Filed: Apr. 27, 1989

[30] Foreign Application Priority Data

Apr. 28, 1988 [JP] Japan .................................. 63-104192

[51] Int. Cl.$^5$ ............................................. B29C 45/40
[52] U.S. Cl. .................................... 425/556; 264/336; 425/436 R; 425/438; 425/444
[58] Field of Search .................... 264/336; 425/436 R, 425/436 RM, 438, 444, 554, 556

[56] References Cited

U.S. PATENT DOCUMENTS

2,799,049 7/1957 Wilson .................................. 425/556
4,555,086 11/1985 Kiyotomo .......................... 425/556

Primary Examiner—Jay H. Woo
Assistant Examiner—Timothy W. Heitbrink
Attorney, Agent, or Firm—Warren B. Kice

[57] ABSTRACT

An expansion injection molding die having a plate forming the die cavity, a backup plate, a core plate, ejector pins inserted through the backup plate and the core plate for separating the molded products from the die cavity, and a gas introducing passage communicating with the pressurized gas source for introducing gas into the die cavity. The plate that has holes through which the ejector pins are injected are formed with hollow portions. In each of the hollow portions, a guide ring is installed so that it is freely movable at least two-dimensionally. A sealing member is installed in an expanded hole portion in the guide ring so that it is in sliding contact with the ejector pin.

7 Claims, 9 Drawing Sheets

EXPANSION INJECTION MOLDING DIE

BACKGROUND OF THE INVENTION

1. Field of the Invention

The present invention relates to an expansion injection molding die in which the die cavity is pressurized by a gas before expandable thermoplastic resin is injected.

2. Description of the Prior Art

Figure 1:
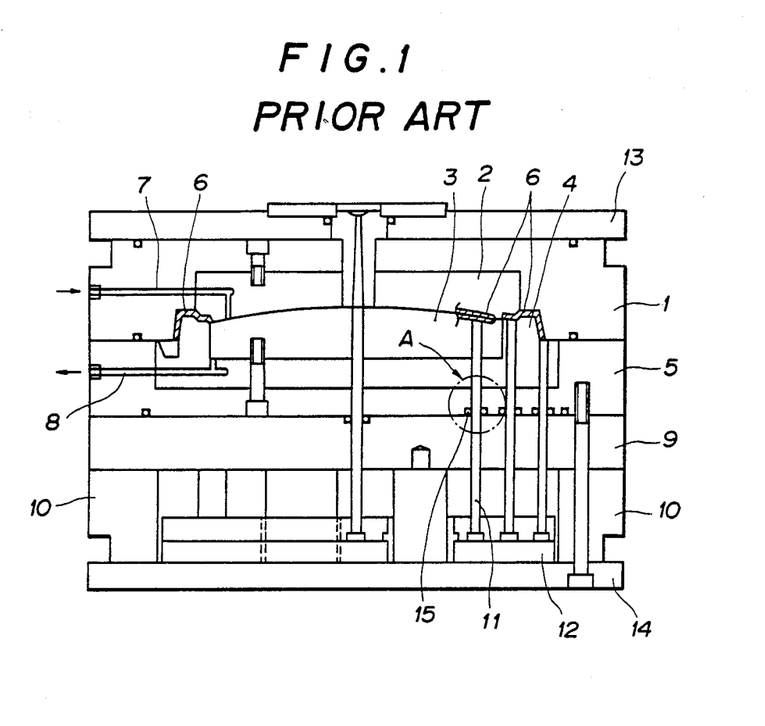
FIG. 1 is an explanatory cross-sectional view showing one example of a conventional expansion injection molding.
Figure 2:
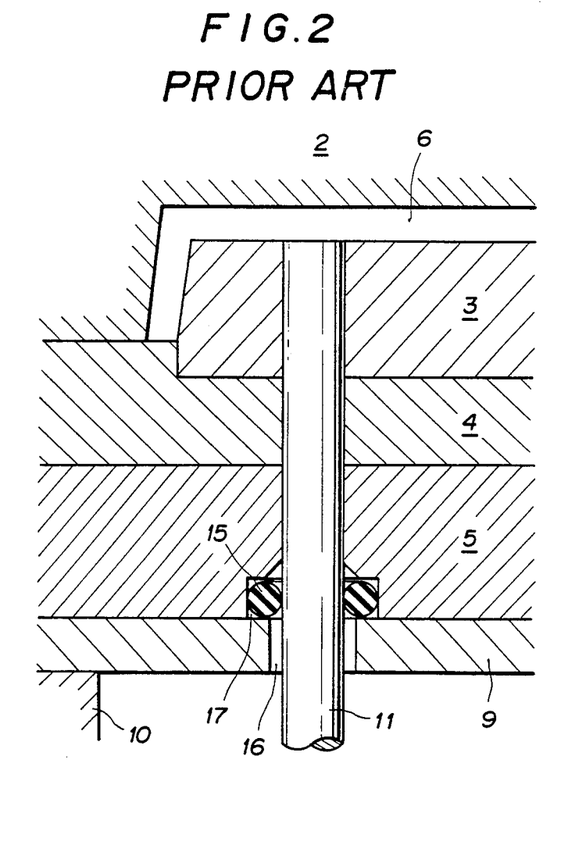
FIG. 2 is an enlarged cross-sectional view of part A in FIG. 1, showing one example of a sealing structure used in the conventional expansion injection molding die.

An example of the conventional expansion injection molding die of this kind is shown in FIGS. 1 and 2. In FIG. 1, reference numerals 1 and 2 represent cavity plates; 3, 4 and 5 core plates; 6 a die cavity and liner portion formed between the cavity plates 1, 2 and the core plates 3, 4, 5; 7 a gas introducing passage to supply the pressurized gas into the die cavity 6, and 8 a gas discharge passage to draw the pressurized gas out of the die cavity 6; 9 a backup plate; 10 a spacer block; 11 a large number of ejector pins to strike the molded products out of the die cavity 6; 12 an ejector plate for holding the ejector pins 11; and 13 and 14 upper and lower mounting plates.

The expansion molding using this type of expansion injection molding die consists of the following molding steps. The die cavity 6 is sealed with a gas under pressure before being injected with expandable molten resin material. When the resin is injected, a relief valve is opened to remove the corresponding volume of gas from the die cavity and thereby keep the interior of the die cavity 6 at a constant pressure. This requires a sealing structure with high sealing performance that can keep the pressure in the die cavity 6.

In one of the known conventional sealing structures of this kind, the ejector plate 12 holding the ejector pins 11 is installed in a large hermetically enclosed chamber (Japanese Utility Model Examined Publication No. 4743/1985). Instead of using the large hermetically enclosed chamber, however, the sealing structure generally uses an O-ring 15 which is provided for each moving ejector pin 11 as shown in FIG. 1.

In the latter sealing method, as shown in FIG. 2, a hollow portion 17 larger in cross section than a hole 16—which is cut through the core plates 3, 4, 5 and the backup plate 9 and through which the ejector pin 11 passes—is formed somewhere in the hole 16 in the core plate 5 on the side contacting the backup plate 9. In the hollow portion 17, the gas-sealing O-ring 15 is installed so that it is in sliding contact with the ejector pin 11 for tight sealing. This sealing method has the advantage of not having to seal a large chamber in which the ejector plate 12 is accommodated. Another advantage is that only a small mount of gas is required to be supplied under pressure.

The above ejector pin sealing structure, however, requires the provision of the hollow portions 17 in the core plate in numbers equal to the number of the O-rings 15. In dies where a large number of ejector pins 11 need to be installed (generally a die for molding large-size products has 50 to 150 ejector pins), it is difficult to attain a specified level of centering precision. In this construction, the machining accuracy of the hollow portion 17 directly affects the sealing performance of the O-ring 15. Furthermore, the ejector pin diameter is generally small, about 3 to 10 mm, and the corresponding diameter of the O-ring 15 is also as small as 1.9 mm. And the flattening size of the O-ring 15 is about 0.28 to 0.47 mm. With these small dimensions, it is difficult to attain the specified machining accuracy of the hollow portion 17, which is formed by cutting the core plate 5. Moreover, since the hollow portions 17 are provided in large numbers, the correct relative positioning between the hollow portions 17 and the holes 16 cannot easily be obtained with a desired precision.

Figure 3:
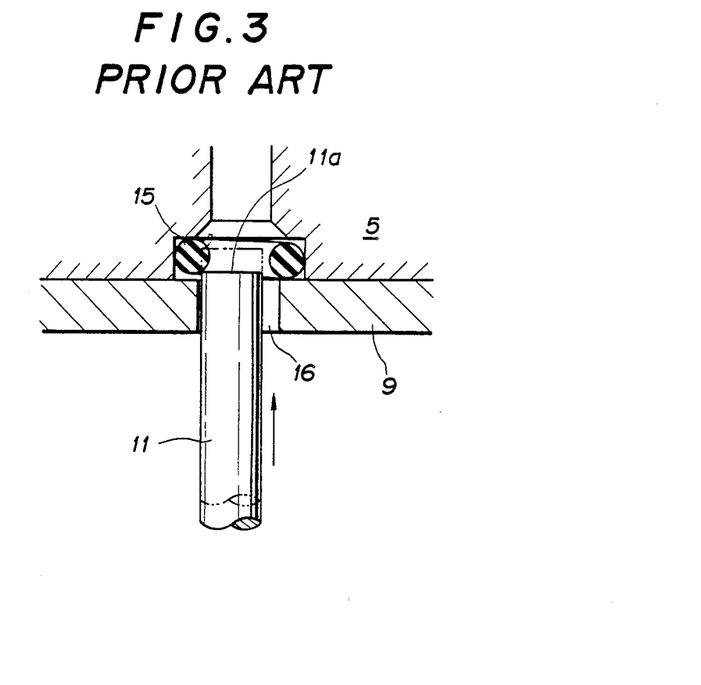
FIG. 3 is a cross-sectional view showing the process of inserting an ejector pin in the conventional die.

As a result, when the ejector pin 11 is inserted into the hole 16 during the assembly of the die, the front end 11a of the ejector pin 11 may damage the O-ring 15, as shown in FIG. 3. This will lead to a sealing failure after some period of operation, making this sealing structure unfit for long period of service.

There is a further disadvantage with this sealing structure. Since the desired centering precision is difficult to obtain, it is necessary to carefully insert the ejector pins 11 one at a time during assembling, put a cap at the front end of each ejector pin 11, guide the O-rings 15, or round the front ends of the ejector pins 11. In addition, the die assembly must be completely overhauled during repair, making the assembly work complex and increasing the number of assembly processes.

SUMMARY OF THE INVENTION

A primary object of this invention is to provide an expansion injection molding die which is capable of improving the durability of the sealing member.

A second object of this invention is to provide an expansion injection molding die in which the sealing members and the ejector pins engage with each other in the correct positional relationship;

A third object of this invention is to provide an expansion injection molding die which is capable of reducing the number of assembling processes in the manufacture of the die.

To achieve the above objectives, the expansion injection molding die according to this invention has the following feature. That is, in an expansion injection molding die which has a number of ejector pins fixedly mounted on an ejector plate and inserted through the backup plate and core plates to separate the molded products from the die cavity and which also has a gas introducing passage communicating with a pressurized gas source to introduce the gas under pressure into the die cavity, this invention is characterized in that hollow portions—each larger in cross section than the ejector pin hole—are provided in the core plate or backup plate through which the ejector pin holes are cut; that a guide ring is installed in each of the hollow portions with a gap between the guide ring and the hollow portion to allow at least two-dimensional movement of the guide ring in the hollow portion; that the guide ring has an ejector pin hole therethrough with a leading funnel-like inlet; that the guide ring has an expanded hole portion in the ejector pin hole in which a gas sealing member is installed in such a way as to be in sliding contact with the ejector pin; and that the guide ring may have a step or a hollow formed along the entire circumference on its external wall as occasion demands on which another gas sealing member is installed so that it contacts the plate in which the hollow portions are formed.

In the above construction, when the ejector pin is inserted and as the front end of the ejector pin is introduced into the leading funnel-like inlet in the guide ring, the guide ring moves in the hollow portion until it comes to the proper position where the front end of the ejector pin aligns with the hole in the guide ring. With the ejector pin centered with respect to the hole in the guide ring, the ejector pin is pushed into the guide ring's hole so that it correctly fits into the O-ring.

With the expansion injection molding die according to this invention, the O-ring is prevented from being damaged by the front end of the ejector pin when the ejector pin is assembled into the die, thus improving the sealing performance and the durability of the O-ring.

Also, since the guide ring is manufactured separately from the die body, the machining accuracy of the guide ring can be improved, which in turn contributes to further improvement in the sealing performance.

Furthermore, since the guide rings are movable in the hollow portions, a large number of ejector pins can be mounted on the ejector plate and inserted at one time, reducing the number of assembling processes and simplifying the assembly work.

This invention will be described in the following in more detail by referring to the accompanying drawings.

DESCRIPTION OF THE PREFERRED EMBODIMENTS

Embodiments of this invention will now be described in detail referring to the attached drawings.

Figure 4:
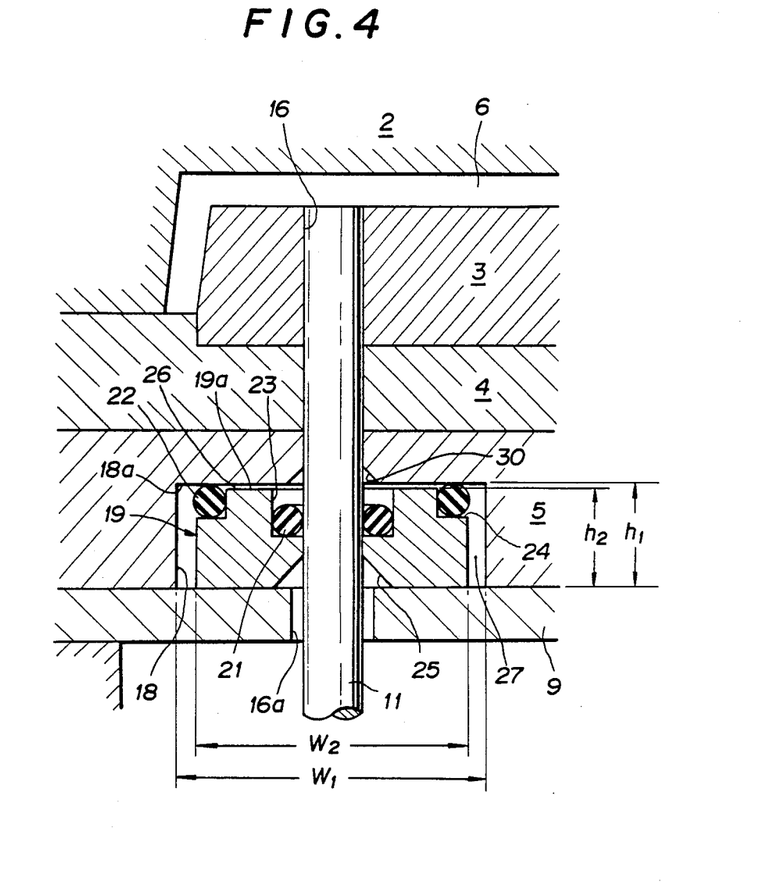
FIG. 4 is an enlarged cross-sectional view—which corresponds to FIG. 2—showing a sealing structure used in the expansion injection molding die as a first embodiment of this invention.
Figure 5:
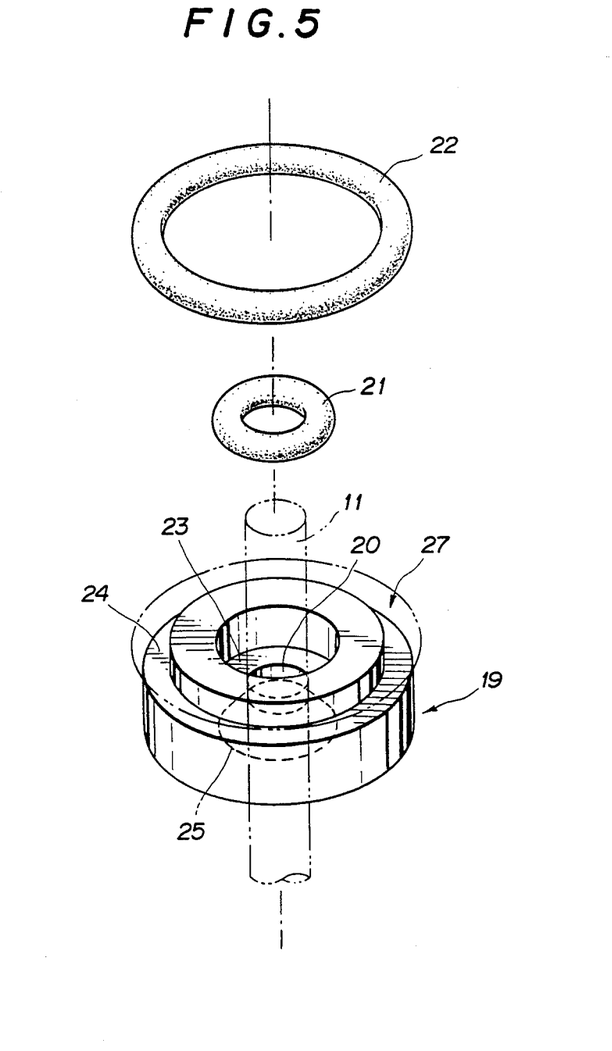
FIG. 5 is a perspective view of the sealing structure of the first embodiment.

FIGS. 4 and 5 show the first embodiment of the expansion injection molding die according to this invention and more particularly a sealing structure for the ejector pin 11. In the expansion injection molding die of this embodiment, detailed description on components other than the sealing structure is not given because they are similar in construction to those of the conventional dies.

In this embodiment also, the core plates 3, 4, 5 and the backup plate 9 are formed with holes 16 therethrough through which the ejector pins 11 pass (the hole 16a in the backup plate 9 and the hole in the core plate 5 are formed slightly larger in diameter than those in other plates). The ejector pins 11 are slid up and down the holes 16. The core plate 5 is formed with hollow portions 18 on the side in contact with the backup plate 9 at the positions facing the holes 16a, the hollow portions 18 being circular in cross section and larger in diameter than the holes 16, 16a. The O-rings to slidably seal the ejector pin 11 are installed in the hollow portions 18. In this embodiment, a guide ring 19 is also installed in each of the hollow portions 18 for sealing.

The guide ring 19, as shown in FIGS. 4 and 5, has a hole 20 formed in the center of a cylindrical member through which the ejector pin 11 passes. The guide ring 19 has, as occasion demands, steps 23, 24 formed along the entire circumference of the upper inner wall and of the upper outer wall on which a small-diameter O-ring 21 and a large-diameter O-ring 22 are firmly seated. The guide ring 19 also has a downwardly expanding funnel-shaped leading opening 25 formed at the lower part of the hole 20.

The hole 20 in the guide ring 19 is cut to an internal dimension almost equal to the shaft diameter of the ejector pin 11. When the small-diameter O-ring 21 is placed on the inner step 23 that forms an expanded hole, the inner circumferential part of the O-ring 21 slightly projects inwardly into the hole 20. The inwardly bulged portion of the O-ring 21, when the ejector pin 11 is inserted, is pressed backward by the ejector pin 11, thereby providing a resilient and tight sealing contact between the O-ring inner surface and the outer circumferential surface of the ejector pin 11.

The hollow portion 18 of the core plate 5 in which the guide ring 19 is installed is formed significantly larger than the hollow portion 17 in the abovementioned conventional die. The hollow portion 18 is dimensioned as shown in FIG. 4 with respect to the guide ring 19. That is, the depth $h_1$ of the hollow portion 18 is set slightly larger than the height $h_2$ of the guide ring; and the inner diameter $w_1$ is set substantially larger than the outer diameter $w_2$ of the guide ring 19. With the guide ring 19 installed in the hollow portion 18, the large-diameter O-ring 22 seated on the outer step 24 of the guide ring 19 projects upward from the upper surface 19a of the guide ring 19 and is in resilient contact with the ceiling surface 18a of the hollow portion 18, as shown in FIG. 4. Thus, between the upper surface 19a and the ceiling surface 18a is formed a small gap 26 that allows the horizontal movement of the guide ring 19. In addition, between the outer circumferential surface of the guide ring 19 and the inner circumferential wall surface of the hollow portion 18 is formed a significantly large gap 27 that permits the guide ring 19 to freely move horizontally in two dimensions, as shown in FIGS. 4 and 5. A tapered or funnel-shaped leading opening 30 is formed in the ceiling surface 18a of the hollow portion 18 so that it merges into the hole of the core plate 5.

Figure 6:
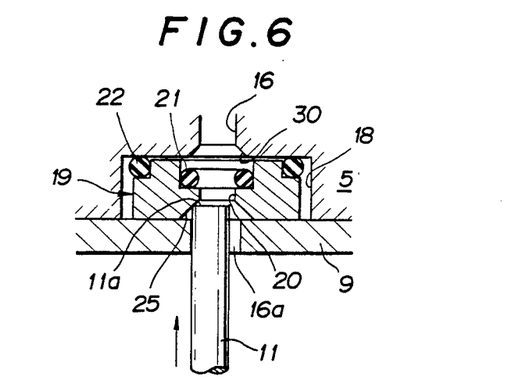
FIGS. 6 through 8 are cross-sectional views showing the process of inserting the ejector pin in the first embodiment.
Figure 7:
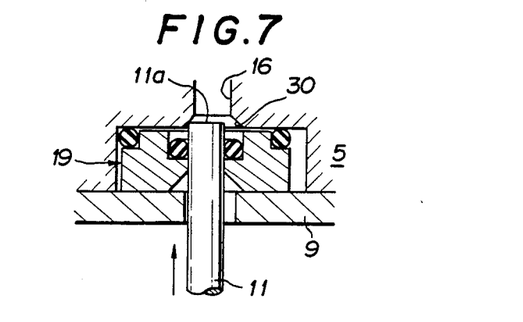
Figure 8:
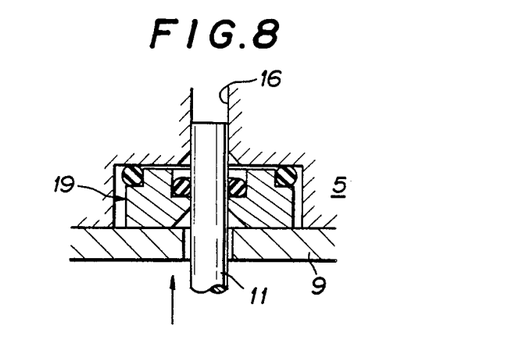

Next, we will explain about the process of assembling the die with the above sealing structure by referring to FIGS. 6 through 8. First, the guide ring 19, which was manufactured separately from the die, is installed in the hollow portion 18 in the core plate 5. Then it is combined with the backup plate 9 and the core plates 3, 4, 5. At this time a strict positioning of the guide ring 19 is not necessary.

Then, the ejector pin 11 is inserted into the holes 16, 16a passing through the backup plate 9 and the core plate 5. At this time, if the guide ring 19 is not located at the specified position as shown in FIG. 6, the front end 11a of the ejector pin 11 can be guided into the inlet of the hole 20 in the guide ring 19. That is, the front end 11a of the ejector pin 11 abuts against the taper surface of the leading opening 25 of the guide ring 19 and as it is led toward the rear of the leading opening 25, the ejector pin 11 moves the guide ring 19 horizontally in the hollow portion 18 so that its front end 11a can be introduced into the inlet of the hole 20 in the guide ring 19. The small-diameter O-ring 21 has a fixed position relative to the guide ring 19, so that the positioning of the guide ring 19 automatically sets the O-ring 21 at a proper position. Thus, the ejector pin 11 can be inserted without causing any damage to the O-ring 21 by the front end 11a, as it would in the conventional dies. It is preferable that the inner surfaces of the hollow portion 18 and the O-ring 21 be applied with grease.

The front end 11a of the ejector pin 11 that was inserted through the guide ring 19 is then guided by the leading opening 30 of the hole 16 in the core plate 5, as shown in FIG. 7, to move the ejector pin 11 together with the guide ring 19 in the hollow portion 18 until the guide ring 19 is positioned as shown in FIG. 8 allowing the ejector pin 11 to be correctly inserted into the hole 16.

Since in this embodiment the guide ring 19 can be freely moved horizontally within the hollow portion 18 to assume an appropriate sealing position, the O-ring 21 is not damaged by the ejector pin 11 being inserted, improving the sealing performance and durability of the sealing structure. Another advantage of this embodiment is that the machining accuracy of the hollow portion 18 does not directly affect the sealing performance of the O-ring 21 and that the large size of the hollow portion 18 facilitates the machining work. Moreover, since the guide ring 19 is manufactured separately from the die, the machining accuracy of the guide ring can be improved.

Figure 9:
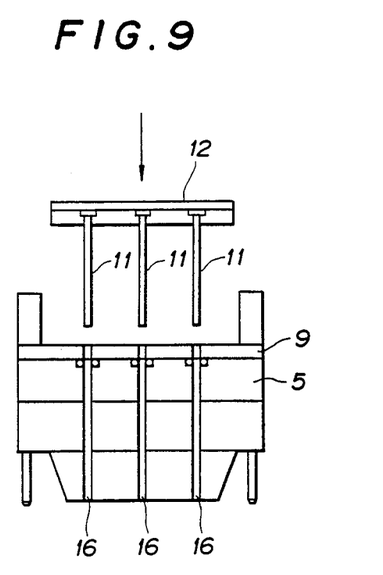
FIG. 9 is a side view showing the entire die of the first embodiment with a large number of ejector pins assembled.

These features make it possible to preassemble a large number of ejector pins 11 onto the ejector plate 12, as shown in FIG. 9, and insert the ejector pin assembly into the holes 16 at one time. This construction obviates the need to overhaul the entire die apparatus during repair, reducing the number of assembling and disassembling processes.

Figure 10:
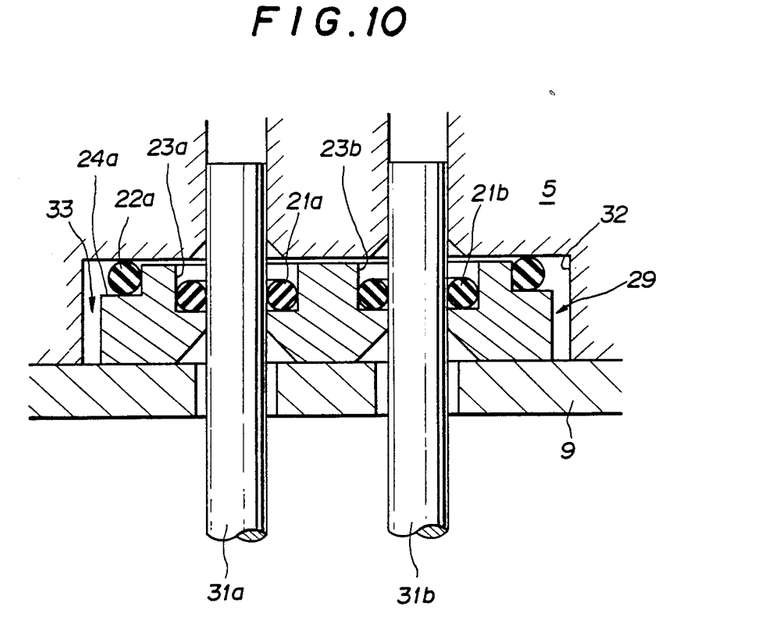
FIG. 10 is a cross-sectional view—which corresponds to FIGS. 2 and 4—showing a sealing structure used in the expansion injection molding die as a second embodiment of this invention.
Figure 11:
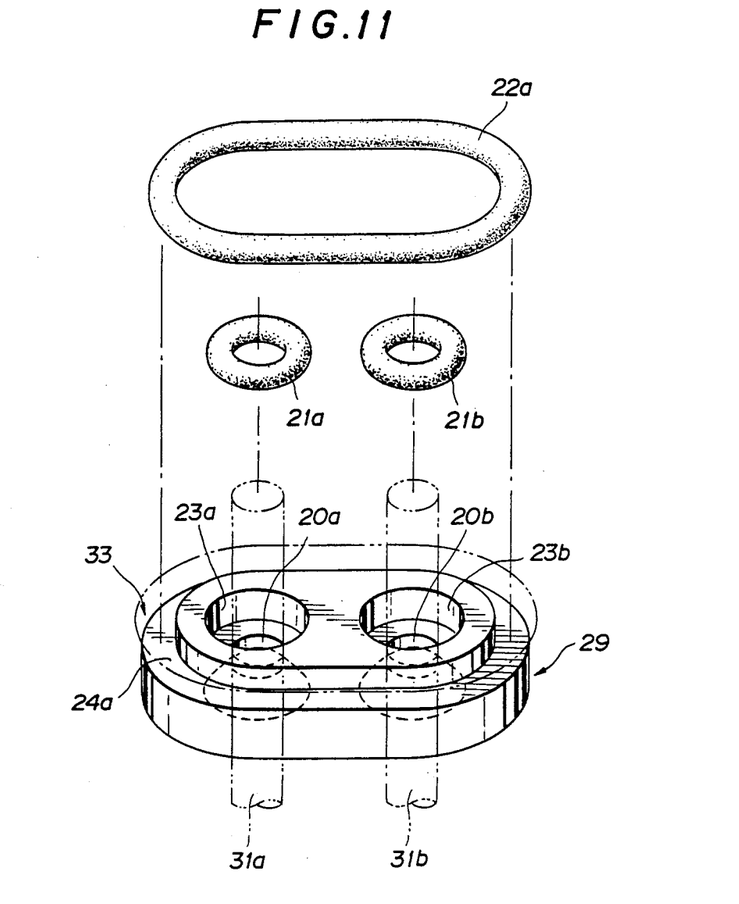
FIG. 11 is a perspective view of the sealing structure of the second embodiment.

FIGS. 10 and 11 show a second embodiment of this invention. In this embodiment two ejector pins 31a, 31b are sealed by a single guide ring 29. That is, the guide ring 29 is a flat oval cylindrical member with a pair of right and left holes 20a, 20b. The guide ring 29 has steps 23a, 23b formed at the upper inner walls of holes 20a, 20b and a step 24a at the upper outer wall of the guide ring 29. Small-diameter O-rings 21a, 21b and a large-diameter O-ring 22a are seated on the steps 23a, 23b and the step 24a, respectively. The relationship between the steps 23a, 23b, 24a and the O-rings 21a, 21b, 22a is the same as that in the first embodiment. The hollow portion 32 formed in the core plate 5 is shaped in oval to conform with the external dimensions of the guide ring 29. There is a gap 33 between the outer circumferential surface of the guide ring 29 and the hollow portion 32 so that the guide ring 29 can move freely in the gap 32 horizontally in two dimensions.

In this example, after the guide ring 29 is installed in the hollow portion 32 of the core plate 5, the ejector pins 32a, 32b are inserted in the following manner. When the ejector pins are inserted one at a time, i.e., the ejector pin 31a is inserted first, followed by the other ejector pin 31b, the guide ring 29 is set in the correct position by the first ejector pin 31a being inserted, allowing the second ejector pin 31b to be smoothly inserted. When the two ejector pins 31a, 31b are inserted at the same time, the guide ring 29 can also be adjusted to the correct position.

In this way, this embodiment seals the two ejector pins 31a, 31b simultaneously by a single guide ring 29, which reduces the number of hollow portions 32 formed in the core plate 5 in half, making the machining process easier.

The number of the ejector pins is not limited to two 31a, 31b as in this example and three or more ejector pins may be sealed by a single guide ring.

While in the above two examples, the hollow portions 18, 32 to accommodate the guide rings 19, 29 are formed in the core plate 5, they may be formed in either the backup plate or core plate as long as they are located somewhere in the holes 16, 16a between the backup plate 9 and the die cavity 6.

Further, in the above two embodiments, the position of the step portions 24, 24a and the large-diameter O-ring 22, 22a are not limited to those features as described above and shown in the attached drawings. The steps 24, 24a may be formed on the eh bottom portion of the guide rings 19, 29, and the large-diameter O-rings 22, 22a can be seated on the steps in a manner that these large-diameter O-rings contact with the backup plate 9.

While this invention has been described in connection with the preferred embodiments, various modifications may be made to these embodiments without department from the spirit and scope of the present invention.

What is claimed is:
1. An expansion injection molding die comprising:
   a cavity plate;
   a core plate for forming a die cavity between the core plate and the cavity plate;
   a backup plate for supporting the core plate;
   holes formed through the backup plate and the core plate the holes extending to the die cavity;
   ejector pins held on an ejector plate, the ejector pins being adapted to be inserted into the holes to separate molded products from the die cavity;
   a gas introducing passage communicating with a pressurized gas source to introduce a gas under pressure into the die cavity;
   hollow portions formed in at least one of said backup plate and said core plate, the hollow portions having cross sections larger than the holes formed through the backup plate and the core plate;
   guide rings each having an ejector pin insertion hole and a seal accommodating portion, the seal accommodating portion being set larger in diameter than the ejector pin insertion hole, the guide rings being installed int he respective hollow portions in such a way that they are movable int he hollow portions at least two-dimensionally; and
   a first sealing member installed in the sal accommodating portion, the first sealing member being in sliding contact with an ejector pin where an associated ejector pin passes through an ejector pin insertion hole of a guide ring.
2. An expansion injection molding die as set forth in claim 1, wherein each of the guide rings have a plurality of ejector pin insertion holes formed therethrough.
3. An expansion injection molding die as set forth in claim 1, wherein the an inlet portion of the ejector pin insertion hole in the guide ring is formed in such a manner that a diameter of the hole gradually deceases from a pin inlet side inwardly.

4. An expansion injection molding die as set forth in claim 3, wherein a step is formed along an outer circumference of the guide ring in such a way that a width of the step extends radially inwardly and a second sealing member is installed on the step.

5. An expansion injection molding die as set forth in claim 4, wherein the hollow portion accommodating the guide ring is formed in the backup plate.

6. An expansion injection molding die as set forth in claim 4, wherein the hollow portion accommodating the guide ring is formed in the core plate.

7. An expansion injection molding die as set forth in claim 4, wherein the first and second sealing members are formed of O-rings.

* * * * *